(12) United States Patent
Kim et al.

(10) Patent No.: US 12,654,516 B2
(45) Date of Patent: Jun. 16, 2026

(54) VEHICLE AIR VENT SYSTEM

(71) Applicants: HYUNDAI MOBIS CO., LTD., Seoul (KR); NIFCO KOREA INC., Asan-si (KR)

(72) Inventors: Seung Cheol Kim, Yongin-si (KR); Geun Heung Kim, Yongin-si (KR)

(73) Assignees: HYUNDAI MOBIS CO., LTD., Seoul (KR); NIFCO KOREA INC., Asan-si (KR)

( * ) Notice: Subject to any disclaimer, the term of this patent is extended or adjusted under 35 U.S.C. 154(b) by 383 days.

(21) Appl. No.: 18/375,315

(22) Filed: Sep. 29, 2023

(65) Prior Publication Data

US 2024/0399839 A1 Dec. 5, 2024

(30) Foreign Application Priority Data

May 30, 2023 (KR) ........................ 10-2023-0069142

(51) Int. Cl.
B60H 1/34 (2006.01)
B60H 1/24 (2006.01)
(52) U.S. Cl.
CPC ... B60H 1/3428 (2013.01); B60H 2001/3471 (2013.01)
(58) Field of Classification Search
CPC .... B60H 1/242; B60H 1/3414; B60H 1/3428; B60H 2001/3471
See application file for complete search history.

(56) References Cited

U.S. PATENT DOCUMENTS

| | | |
|---|---|---|
| 2019/0270363 A1 | 9/2019 | Hoerschler et al. |
| 2020/0207181 A1 | 7/2020 | Eichhorn et al. |
| 2020/0406722 A1 | 12/2020 | Kim |

FOREIGN PATENT DOCUMENTS

| | | | | |
|---|---|---|---|---|
| CN | 113427974 A | * | 9/2021 | ........... B60H 1/3414 |
| KR | 10-2021-0001534 A | | 1/2021 | |
| KR | 10-2022-0166103 A | | 12/2022 | |

OTHER PUBLICATIONS

CN113427974 and translation (Year: 2021).*
Office Action issued in corresponding Korean Patent Application No. 10-2023-0069142 dated Apr. 18, 2025.
Extended European Search Report issued in corresponding European Patent Application 23201501.6 dated Apr. 4, 2024.

* cited by examiner

*Primary Examiner* — Steven S Anderson, II

(74) *Attorney, Agent, or Firm* — MORGAN, LEWIS & BOCKIUS LLP

(57) ABSTRACT

A vehicle air vent system includes a garnish mounted on a cockpit and a vent module configured to discharge air transferred from an air conditioner together with the garnish and be covered by the garnish, wherein the vent module includes a duct housing into which the air transferred from the air conditioner is introduced, a nozzle configured to be disposed in the duct housing and rotate in the duct housing to guide the air introduced into the duct housing, a first wing configured to be disposed in front of the nozzle in an air flow direction and rotate in the duct housing in a different direction from a direction in which the nozzle rotates, a second wing configured to be disposed in front of the first wing in the air flow direction and disposed behind the garnish to guide air passing through the first wing, and a rotation driving assembly configured to connect the nozzle and the second wing and rotate the nozzle and the second wing in the same direction.

9 Claims, 16 Drawing Sheets

2600:2610, 2620, 2630, 2640, 2650

[FIG. 1]
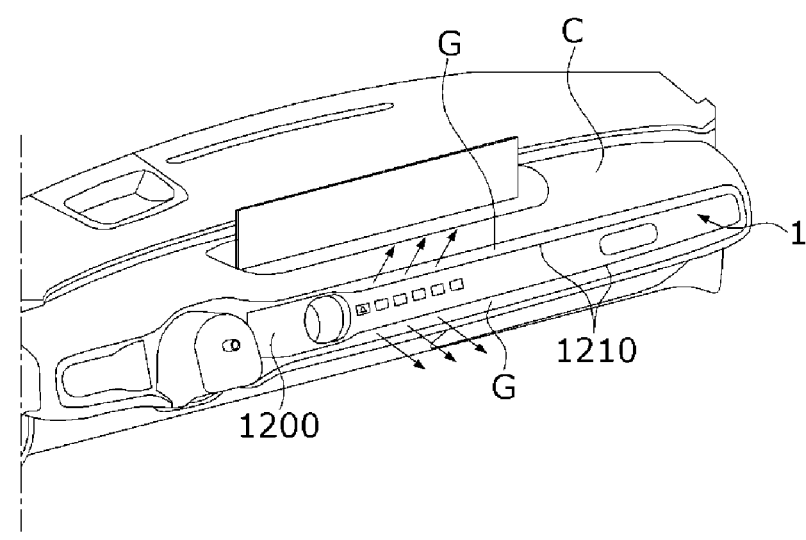

[FIG. 2]
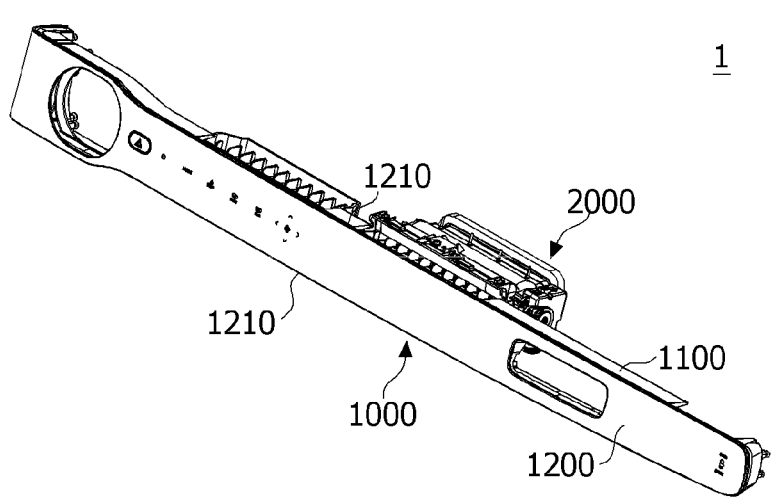

[FIG. 3]
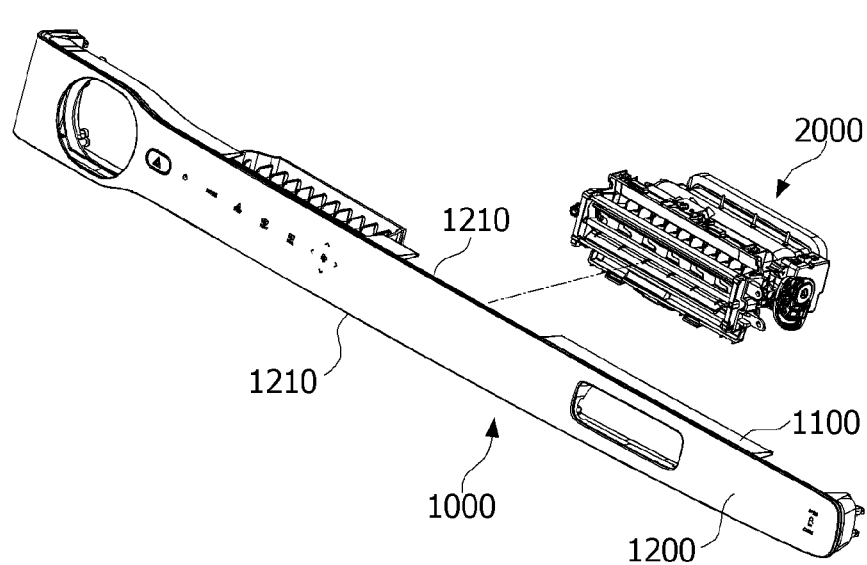

[FIG. 4]
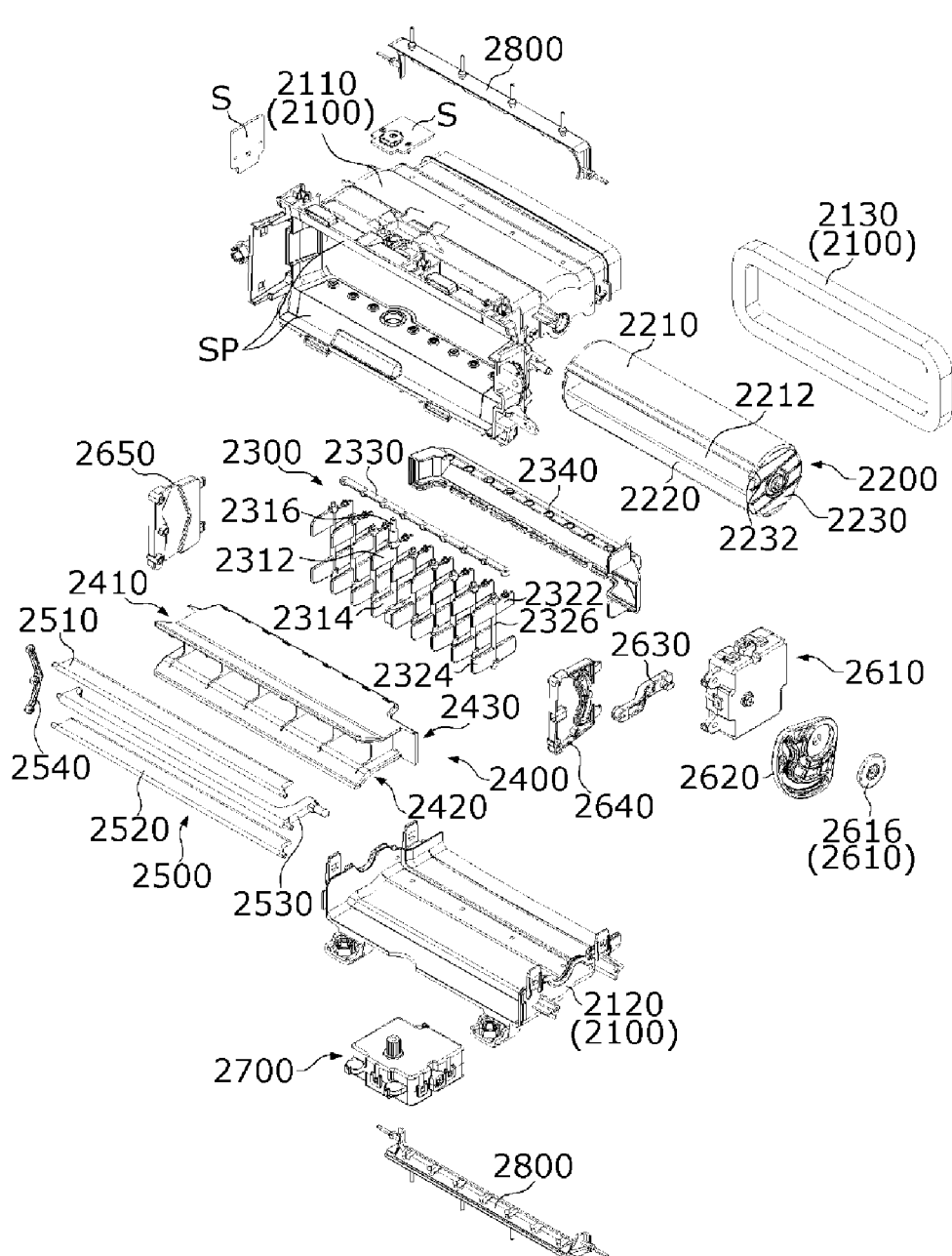
2600:2610, 2620, 2630, 2640, 2650

[FIG. 5]
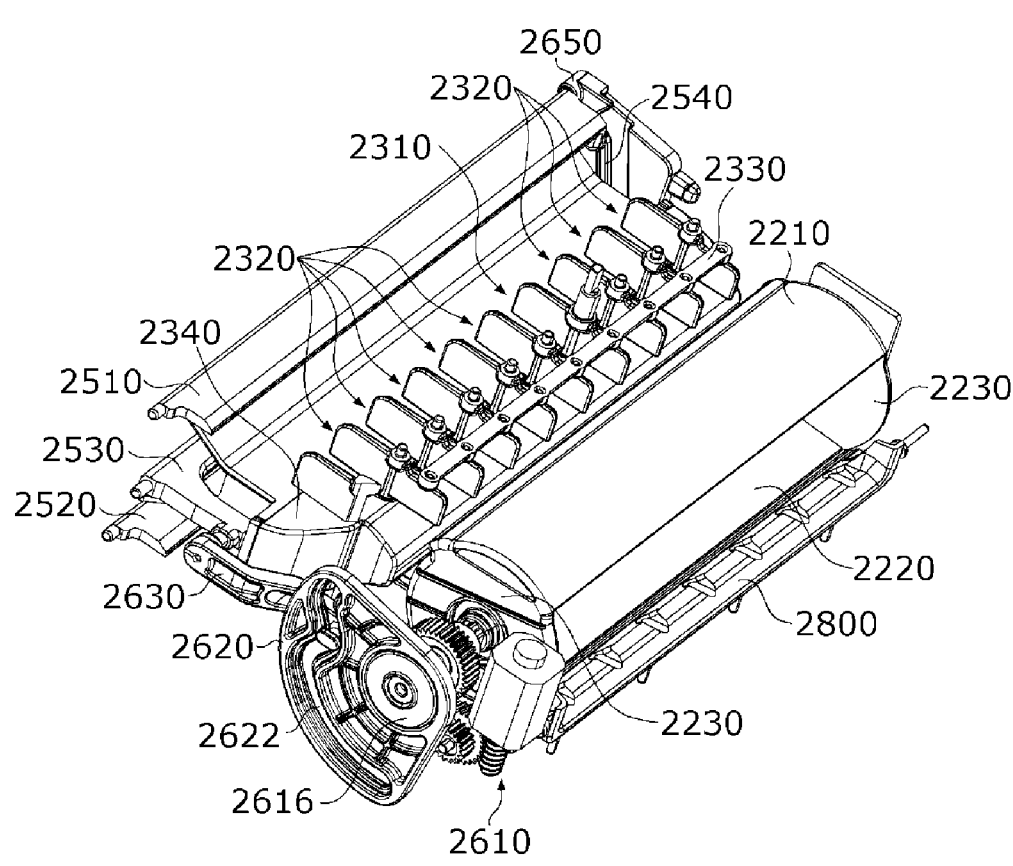

[FIG. 6]
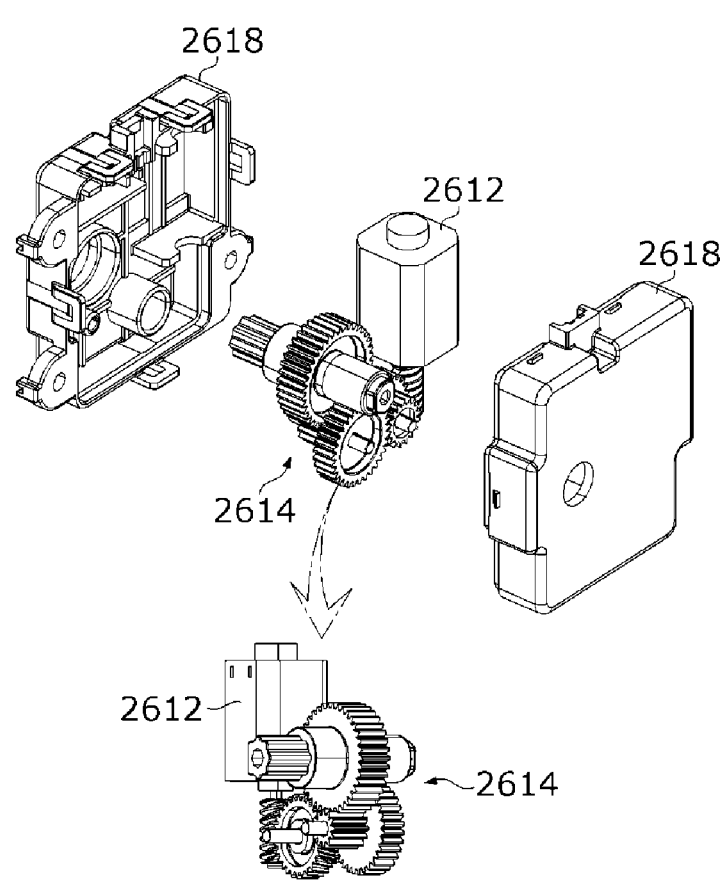

[FIG. 8]
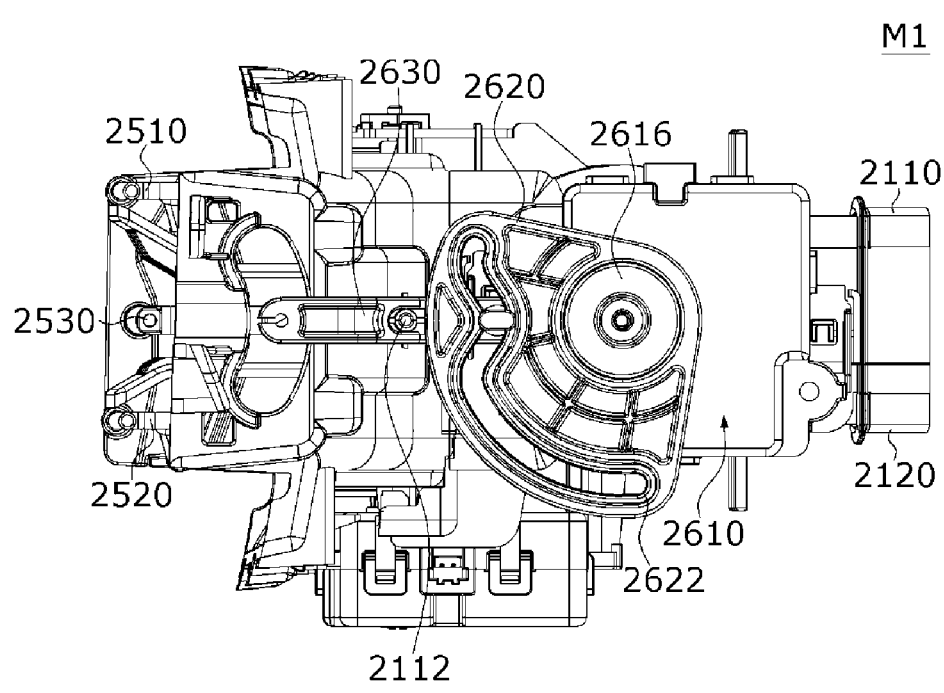

[FIG. 9]
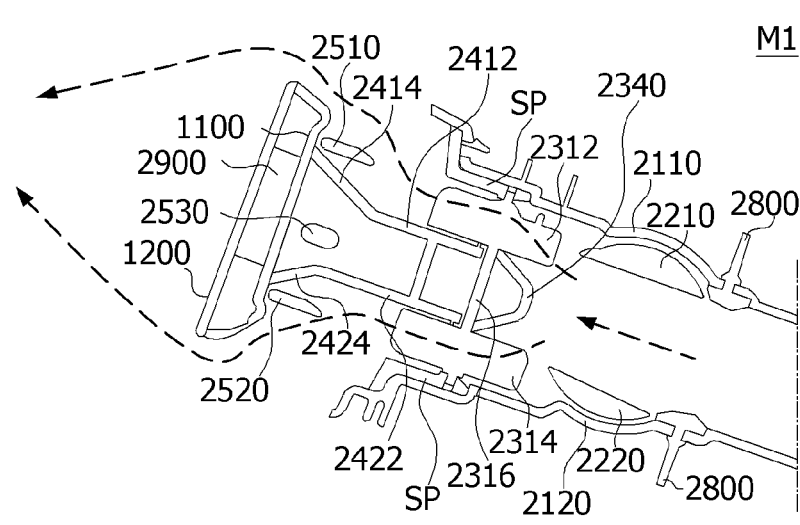
◄— — :AIR FLOW PATH

[FIG. 10]
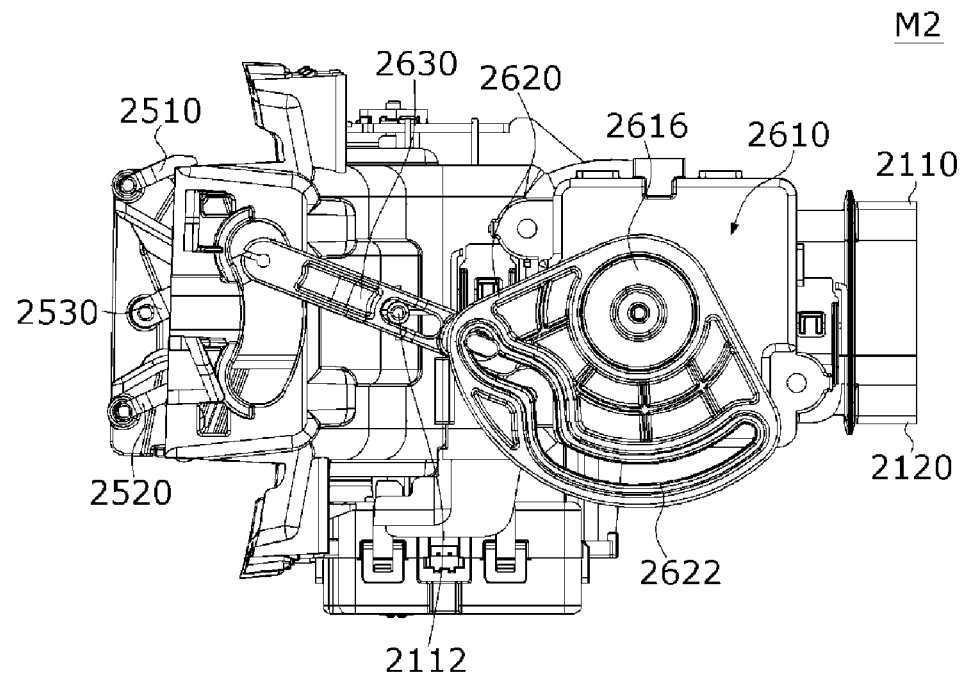

[FIG. 11]
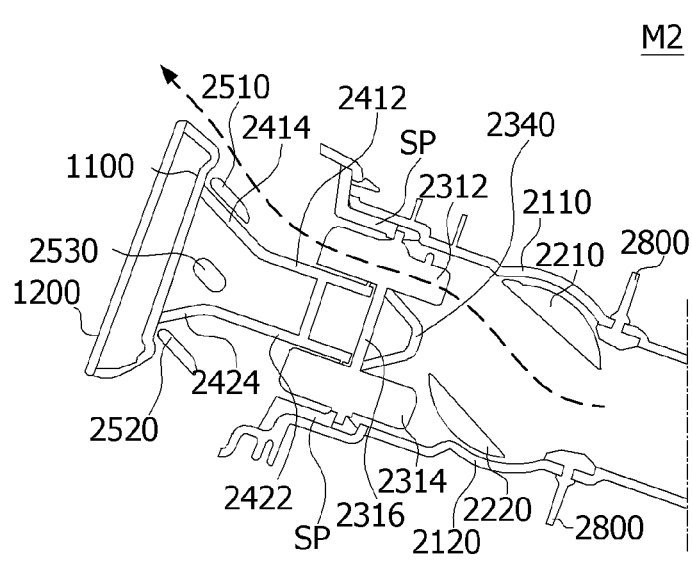
← — :AIR FLOW PATH

[FIG. 12]
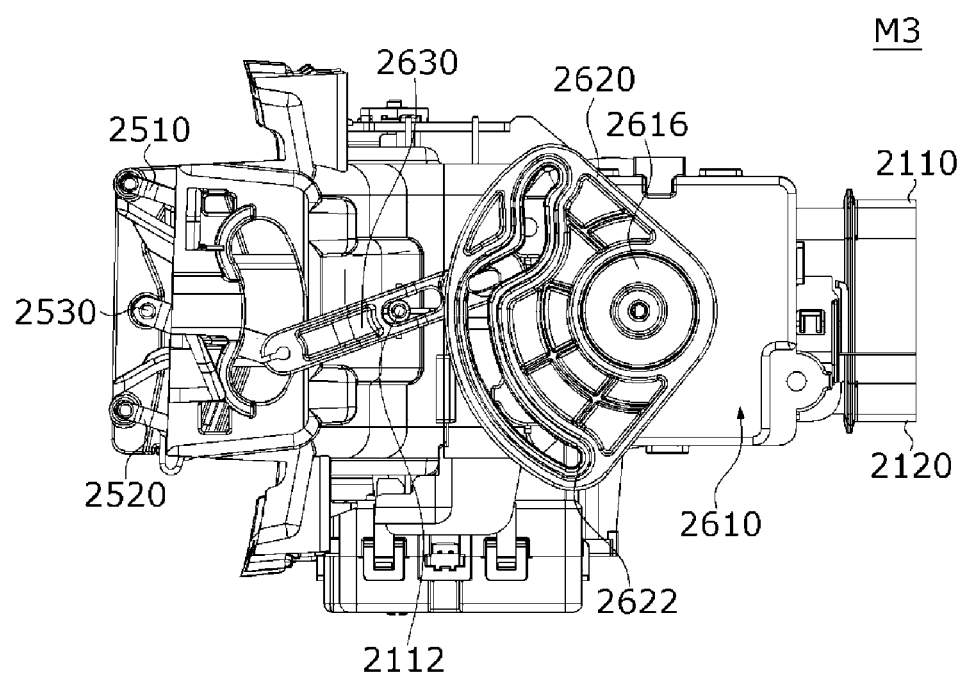

[FIG. 13]
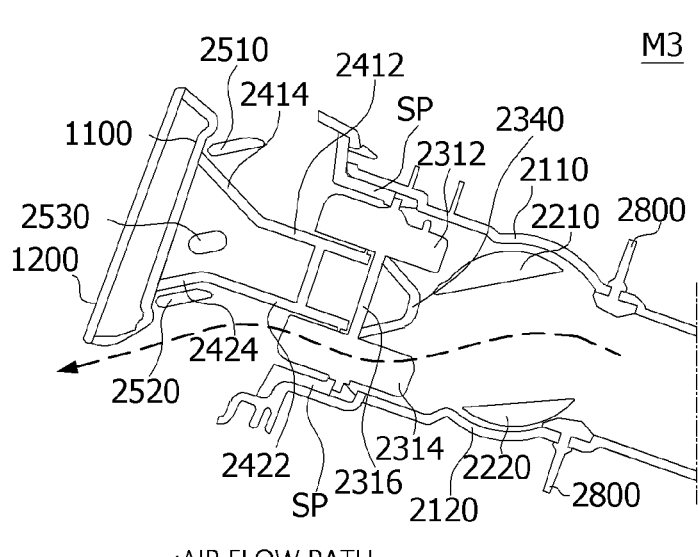
←— — :AIR FLOW PATH

[FIG. 14]
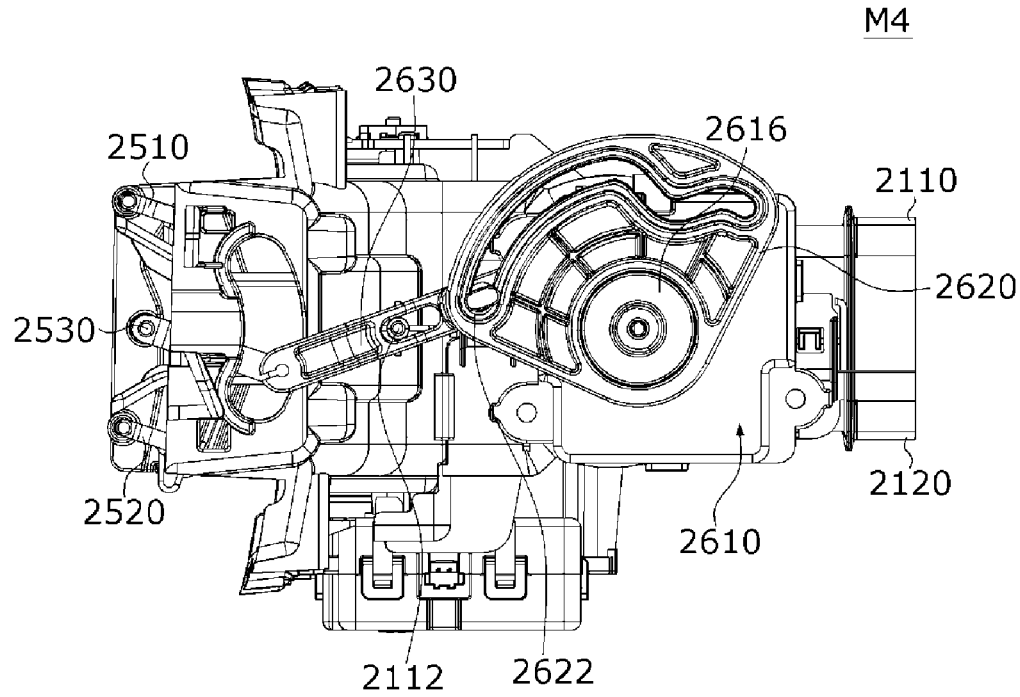

[FIG. 15]
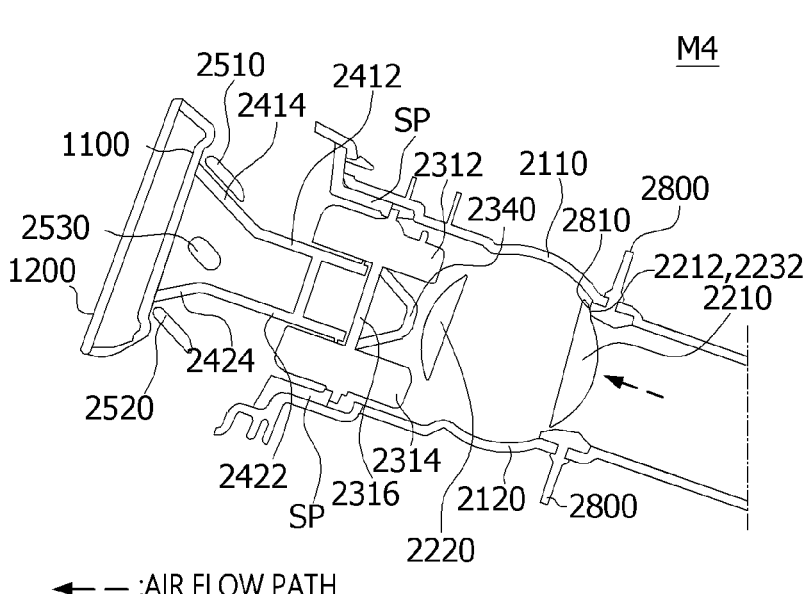
← — :AIR FLOW PATH

[FIG. 16]
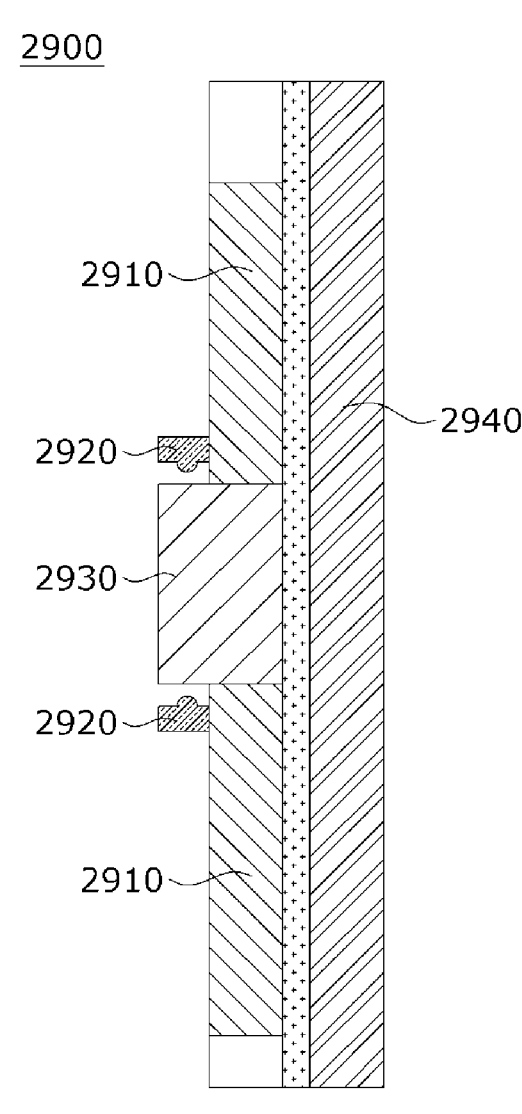

VEHICLE AIR VENT SYSTEM

CROSS-REFERENCE TO RELATED APPLICATION

This application claims priority to and the benefit of Korean Patent Application No. 10-2023-0069142, filed on 30 May 2023, the disclosure of which is incorporated herein by reference in its entirety.

BACKGROUND

1. Field of the Invention

The present invention relates to a vehicle air vent system.

2. Discussion of Related Art

An air vent may be connected to an air conditioner and guide air discharged from the air conditioner into an interior of a vehicle.

A conventional air vent may include a duct through which air passes, a front wing which is disposed in the duct and controls wind in a left-right direction, a rear wing which is disposed in a duct housing and controls wind in a vertical direction, and a knob unit coupled to the rear wing and manipulated by a user.

The conventional air vent has a structure coupled to a cockpit of a vehicle and exposed to a passenger room, and in recent years, a structure in which an air vent is not exposed has been required for design diversification of a cockpit.

Accordingly, unlike the conventional air vent having the structure in which the user directly manipulates the knob unit to control a wind direction, in the air vent which may not be exposed to the passenger room, a wind direction may be controlled by an indirect manipulation rather than by a direct manipulation, and thus there is a problem that the number of unexposed components for controlling the wind direction increases.

SUMMARY OF THE INVENTION

The present invention is directed to providing a vehicle air vent system which satisfies a structure for controlling a wind direction and maintaining a wind volume without exposing components for controlling the wind direction.

According to an aspect of the present invention, there is provided a vehicle air vent system including a garnish mounted on a cockpit and a vent module which discharges air transferred from an air conditioner together with the garnish and is covered by the garnish, wherein the vent module includes a duct housing into which the air transferred from the air conditioner is introduced, a nozzle which is disposed in the duct housing and rotates in the duct housing to guide the air introduced into the duct housing, a first wing which is disposed in front of the nozzle in an air flow direction and rotates in the duct housing in a different direction from a direction in which the nozzle rotates, a second wing which is disposed in front of the first wing in the air flow direction and disposed behind the garnish to guide air passing through the first wing, and a rotation driving assembly which connects the nozzle and the second wing and rotates the nozzle and the second wing in the same direction.

The rotation driving assembly may include a first driving unit including a motor which generates a driving force, a gear unit which connects the motor and the nozzle, and a hinge plate coupled to the gear unit and rotated together with the gear unit, a first guide plate coupled to the hinge plate of the first driving unit and rotated along the hinge plate, and a link arm which connects the first guide plate and the second wing and, when the first guide plate rotates, is guided by the first guide plate to change a position of the link arm.

The rotation driving assembly may include a second guide plate disposed between the second wing and the link arm and connected to the second wing to guide a movement direction of the second wing which moves along the link arm.

The vehicle air vent system may include a partition unit which is disposed behind the garnish in the air flow direction and guides movement of the air passing through the first wing.

The vehicle air vent system may include a second driving unit which rotates the first wing, wherein the first wing may include a main wing which is connected to the second driving unit to be rotated by the second driving unit and includes a 1-1 wing and a 1-2 wing disposed to be spaced apart from each other in a direction intersecting the air flow direction and a plurality of sub wings which are disposed at two side portions of the main wing and, when the main wining rotates, rotated in the same direction as a direction in which the main wing rotates, and include 1-3 wings and 1-4 wings disposed to be spaced apart from each other in a direction intersecting the air flow direction.

The partition unit may include a first partition part disposed close to the 1-1 wing and the 1-3 wings and a second partition part disposed close to the 1-2 wing and the 1-4 wings, wherein the first partition part may include a first inclined part disposed to be inclined in a direction from the 1-2 wing toward the 1-1 wing, and the second partition part may include a second inclined part disposed to be inclined in a direction from the 1-1 wing toward the 1-2 wing.

The nozzle may rotate so that air moves toward the 1-1 wing and the 1-3 wings in an upward mode and toward the 1-2 wing and the 1-4 wings in a downward mode.

The nozzle may include a first nozzle plate having a length in a width direction of the duct housing, a second nozzle plate which is disposed to be spaced apart from the first nozzle plate to form an air flow path and opens or closes one region in the duct housing together with the first nozzle plate, and a side cover connected to the gear unit of the first driving unit and rotated in conjunction with the gear unit to rotate the first nozzle plate and the second nozzle plate.

The garnish may include an inside garnish which is disposed in front of the second wing in the air flow direction and guides the air passing through the first wing together with the second wing and an outside garnish coupled to the inside garnish and disposed to be exposed to a passenger room, wherein the outside garnish may include a discharge groove which is formed concavely in a direction intersecting the air flow direction and forms an air discharge path together with the cockpit.

The vehicle air vent system may include a lighting unit which is disposed between the inside garnish and the outside garnish and emits light toward the outside garnish.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a view illustrating a vehicle air vent system according to one embodiment of the present invention installed in a cockpit;

FIG. 2 is a perspective view illustrating the vehicle air vent system according to one embodiment of the present invention;

FIG. 3 is an exploded perspective view illustrating the vehicle air vent system according to one embodiment of the present invention;

FIG. 4 is an exploded perspective view illustrating a vent module;

FIG. 5 is a view illustrating a rotation driving assembly connected to a nozzle and a second wing;

FIG. 6 is an exploded perspective view illustrating a first driving unit;

FIG. 7 is an exploded perspective view illustrating a second driving unit;

FIG. 8 is a view illustrating the vent module in a normal mode;

FIG. 9 is a view illustrating a path along which air flows in the vent module in the normal mode;

FIG. 10 is a view illustrating the vent module in an upward mode;

FIG. 11 is a view illustrating a path along which air flows in the vent module in the upward mode;

FIG. 12 is a view illustrating the vent module in a downward mode;

FIG. 13 is a view illustrating a path along which air flows in the vent module in the downward mode;

FIG. 14 is a view illustrating the vent module in a closed mode;

FIG. 15 is a view illustrating a path along which air flows in the vent module in the closed mode; and FIG. 16 is a schematic view illustrating a lighting unit.

DETAILED DESCRIPTION OF EXEMPLARY EMBODIMENTS

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination of a plurality of associated listed items.

When a first element is referred to as being "connected" or "coupled" to a second element, it will be understood that the first element may be directly connected or coupled to the second element, or a third element may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under the other element, such a description may include a case in which the one element is formed at an upper side or a lower side with respect to the other element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude a possibility of the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when a vehicle air vent system is described in detail with reference to the accompanying drawings, components that are the same or correspond to each other will be denoted by the same or corresponding reference numerals in all drawings, and redundant descriptions will be omitted.

Figure 7:
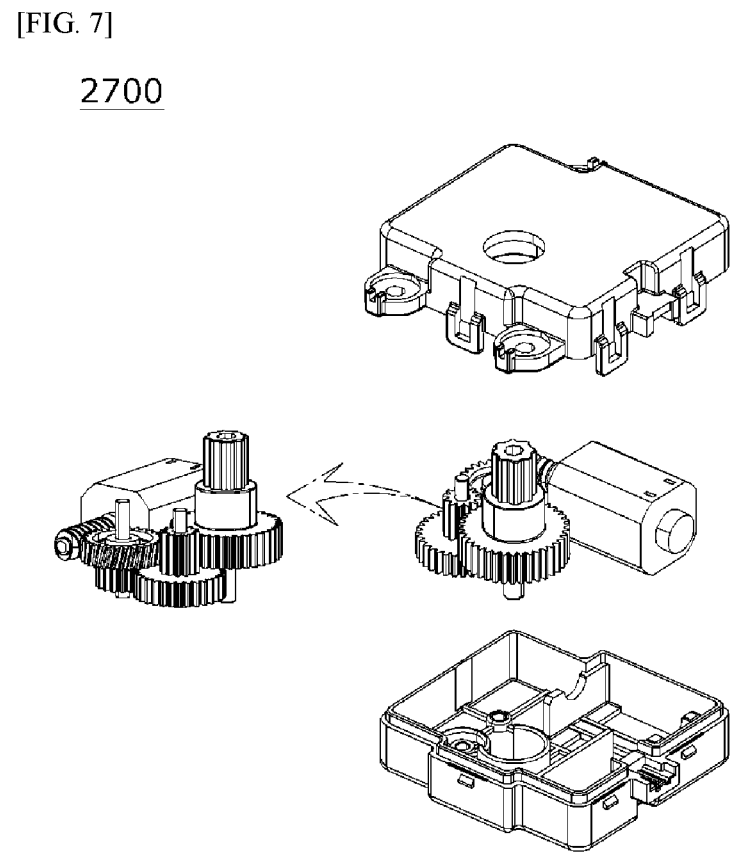

FIG. 1 is a view illustrating a vehicle air vent system according to one embodiment of the present invention installed in a cockpit, and FIG. 2 is a perspective view illustrating the vehicle air vent system according to one embodiment of the present invention. FIG. 3 is an exploded perspective view illustrating the vehicle air vent system according to one embodiment of the present invention, and FIG. 4 is an exploded perspective view illustrating a vent module. FIG. 5 is a view illustrating a rotation driving assembly connected to a nozzle and a second wing, and FIG. 6 is an exploded perspective view illustrating a first driving unit. FIG. 7 is an exploded perspective view illustrating a second driving unit, and FIG. 8 is a view illustrating the vent module in a normal mode. FIG. 9 is a view illustrating a path along which air flows in the vent module in the normal mode.

In the present embodiment, a longitudinal direction may be the same direction as a direction in which air flows in a duct housing 2100, a width direction may be a direction intersecting the longitudinal direction, and a height direction may be a direction perpendicularly intersecting the longitudinal direction and the width direction.

Referring to FIGS. 1 to 9, a vehicle air vent system 1 according to one embodiment of the present invention includes a garnish 1000 mounted on a cockpit C of a vehicle and a vent module 2000 which discharges air transferred through an air conditioner together with the garnish 1000 and is covered by the garnish 1000.

The garnish 1000 may be a type of component mounted on the cockpit C of the vehicle and one component which may add design aesthetics to an interior of the vehicle. The garnish 1000 may include an inside garnish 1100 and an outside garnish 1200.

The inside garnish 1100 may be a component which is not exposed toward a passenger room. The inside garnish 1100 may have a length in the width direction. The inside garnish 1100 may be disposed in front of a second wing 2500, which will be described below, in an air flow direction. The inside garnish 1100 and the second wing 2500 may guide air passing through a first wing 2300 which will be described below. As illustrated in FIG. 9, the inside garnish 1100 may have a hollow shape to form a space for supporting a lighting unit 2900 which will be described below.

The outside garnish 1200 may be a component exposed toward the passenger room. The outside garnish 1200 may be coupled to the inside garnish 1100. The outside garnish 1200 may include a discharge hole 1210. The discharge hole 1210 may be formed concavely from an edge of the outside garnish 1200 in a direction intersecting the air flow direction to form a gap G, which is an air discharge path, together with the cockpit C.

As illustrated in FIG. 9, the outside garnish 1200 may cover the inside garnish 1100. The outside garnish 1200 and the inside garnish 1100 may form a space in which the lighting unit 2900, which will be described below, may be embedded. The outside garnish 1200 may be an input device for transmitting a touched position to a control device provided in the vehicle when a user touches the outside garnish 1200. For example, the outside garnish 1200 may be a touch panel formed of a film material.

In addition, symbols for transmitting signals to various devices such as audio, navigation, and lighting devices installed in the vehicle may be formed on the outside garnish 1200. In addition, in order to implement a normal mode M1, an upward mode M2, a downward mode M3, and a closed mode M4 of the vent module 2000, symbols for activating the normal mode M1, the upward mode M2, the downward mode M3, and the closed mode M4 may be formed on the outside garnish 1200.

The vent module 2000 may include the duct housing 2100, a nozzle 2200, the first wing 2300, a partition unit 2400, the second wing 2500, a rotation driving assembly 2600, a second driving unit 2700, a second seal pad 2800, and the lighting unit 2900.

The duct housing 2100 may be a component through which air transferred from the air conditioner (not shown) is introduced and may have a hollow shape. The duct housing 2100 may accommodate the nozzle 2200 and the first wing 2300 therein. The duct housing 2100 may include an upper housing 2110, a lower housing 2120, and a first seal pad 2130.

The upper housing 2110 and the lower housing 2120 may be coupled to each other. The upper housing 2110 and the lower housing 2120 may be coupled to each other to form an inlet through which air transferred from the air conditioner is introduced and an outlet through which air is discharged. In addition, a protruding region convexly protruding outward to rotatably accommodate the nozzle 2200 may be provided in the upper housing 2110 and the lower housing 2120.

Meanwhile, a spacer SP may be disposed in the upper housing 2110. The spacer SP may be coupled to the first wing 2300 to rotatably support the first wing 2300.

As illustrated in FIG. 4, a sensor S may be attached to an outer surface of the upper housing 2110. The sensor S may be coupled to each of the first wing 2300 and the second wing 2500 to collect rotation information (the number of rotations, a rotation speed, a rotation angle, and the like) of each of the first wing 2300 and the second wing 2500. The sensor S may be any one of a rotation sensor, an angle sensor, and a gyro sensor, and may be formed of a combination thereof.

The first seal pad 2130 may be disposed at a side of the inlet formed when the upper housing 2110 and the lower housing 2120 are coupled. The first seal pad 2130 may be formed of rubber. The first seal pad 2130 may be provided in a hollow quadrangular or ring shape. The first seal pad 2130 may maintain airtightness of the inlet so that air transferred from the air conditioner and moved into the duct housing 2100 does not leak to the outside of the duct housing 2100.

The nozzle 2200 may be disposed in the duct housing 2100. The nozzle 2200 may rotate in the duct housing 2100 to guide air introduced into the duct housing 2100. The nozzle 2200 may include a first nozzle plate 2210, a second nozzle plate 2220, and a side cover 2230. The nozzle 2200 may rotate in the duct housing 2100. More specifically, the nozzle 2200 may rotate from the upper housing 2110 toward the lower housing 2120 and rotate from the lower housing 2120 toward the upper housing 2110.

The first nozzle plate 2210 may have a length in a width direction of the duct housing 2100. The first nozzle plate 2210 may be disposed close to an inner surface of the upper housing 2110 in the normal mode M1 of the vent module 2000. The first nozzle plate 2210 may be provided in a shape having a curved surface.

The first nozzle plate 2210 may include a first tip portion 2212. The first tip portion 2212 may be formed on one region of an edge of the first nozzle plate 2210. The first tip portion 2212 may be in contact with the inner surface of the upper housing 2110 when the first nozzle plate 2210 rotates. When the first tip portion 2212 is in contact with the inner surface of the upper housing 2110, movement of air introduced into the duct housing 2100 may be blocked.

The second nozzle plate 2220 may be disposed to be spaced apart from the first nozzle plate 2210. The second nozzle plate 2220 and the first nozzle plate 2210 may form an air flow path. The second nozzle plate 2220 may be disposed close to an inner surface of the lower housing 2120 in the normal mode M1 of the vent module 2000. The second nozzle plate 2220 may be provided in a shape having a curved surface. The second nozzle plate 2220 and the first nozzle plate 2210 may open or close one region in the duct housing 2100.

The side cover 2230 may be disposed on each of two side portions of the first nozzle plate 2210 and the second nozzle plate 2220 in the width direction. The side cover 2230 may connect the first nozzle plate 2210 and the second nozzle plate 2220. The side cover 2230 may have a circular shape. The side cover 2230 may be connected to a gear unit 2614 of a first driving unit 2610 which will be described below. The side cover 2230 may rotate in conjunction with the gear unit 2614 to rotate the first nozzle plate 2210 and the second nozzle plate 2220.

The side cover 2230 may include a second tip portion 2232. The second tip portion 2232 may be formed on one region of an edge of the side cover 2230. The second tip portion 2232 may be connected to the first tip portion 2212. When the side cover 2230 rotates, the second tip portion 2232 may be in contact with the inner surface of the upper housing 2110. When the second tip portion 2232 is in contact with the inner surface of the upper housing 2110, movement of air introduced into the duct housing 2100 may be blocked.

The first wing 2300 may be disposed in the duct housing 2100. The first wing 2300 may be disposed in front of the nozzle 2200 in the air flow direction. The first wing 2300 may rotate in the duct housing 2100 in a different direction from a direction in which the nozzle 2200 rotates. The first wing 2300 may include a main wing 2310, a plurality of sub wings 2320, a first link plate 2330, and a support block 2340.

The main wing 2310 may be connected to the second driving unit 2700 which will be described below. The main wing 2310 may be rotated by the second driving unit 2700. The main wing 2310 may include a 1-1 wing 2312, a 1-2 wing 2314, and a first rotary shaft 2316.

The 1-1 wing 2312 and the 1-2 wing 2314 may be disposed to be spaced apart from each other in a direction intersecting the air flow direction, that is, the height direction. The 1-1 wing 2312 and the 1-2 wing 2314 may be provided in the same shape. The 1-1 wing 2312 and the 1-2 wing 2314 may be symmetrically disposed to each other.

The first rotary shaft 2316 may connect the 1-1 wing 2312 and the 1-2 wing 2314. The first rotary shaft 2316 may be a component at a rotation center of the main wing 2310 and may be rotatably supported by the spacer SP mounted on the upper housing 2110. The first rotary shaft 2316 may be connected to the second driving unit 2700 and rotated by power generated by the second driving unit 2700. The 1-1 wing 2312 and the 1-2 wing 2314 may be rotated by the rotation of the first rotary shaft 2316.

The plurality of sub wings 2320 may be disposed on two side portions of the main wing 2310. When the main wing 2310 rotates, the plurality of sub wings 2320 may be rotated in the same direction as a direction in which the main wing 2310 rotates. The plurality of sub wings 2320 may each include a 1-3 wing 2322, a 1-4 wing 2324, and a second rotary shaft 2326.

The 1-3 wings 2322 and the 1-4 wings 2324 may be disposed to be spaced apart from each other in a direction intersecting the air flow direction, that is, the height direction. Each of the 1-3 wings 2322 and each of the 1-4 wings 2324 may be provided in the same shape. The 1-3 wing 2322 and the 1-4 wing 2324 may be symmetrically disposed to each other. Each of the 1-3 wing 2322 and the 1-4 wing 2324 may be provided in the same shape as that of each of the 1-1 wing 2312 and the 1-2 wing 2314. The 1-3 wing 2322 and the 1-4 wing 2324 may be disposed to be spaced apart from each other in the width direction.

The second rotary shaft 2326 may connect the 1-3 wing 2322 and the 1-4 wing 2324. The second rotary shaft 2326 may be a component at a rotation center of the sub wing and may be rotatably supported by the spacer SP mounted on the upper housing 2110. The second rotary shaft 2326 may be connected to the second driving unit 2700 and rotated by power generated by the second driving unit 2700. The 1-3 wing 2322 and the 1-4 wing 2324 may be rotated by the rotation of the second rotary shaft 2326.

The first link plate 2330 may be disposed in the width direction. The first link plate 2330 may connect the main wing 2310 and the plurality of sub wings 2320. Holes coupled to the main wing 2310 and the plurality of sub wings 2320 may be formed in the first link plate 2330. When the main wing 2310 rotates, the sub wings may be rotated by the link plate.

The support block 2340 may be disposed between the 1-1 wing 2312 and the 1-2 wing 2314 and between the 1-3 wing 2322 and the 1-4 wing 2324. The support block 2340 may rotatably support the first rotary shaft 2316 and the second rotary shaft 2326. More specifically, support grooves which support a part of the first rotary shaft 2316 and a part the second rotary shaft 2326 may be formed in the support block 2340. The support block 2340 may be coupled to the partition unit 2400.

The nozzle 2200 may rotate so that air moves toward the 1-1 wing 2312 and the 1-3 wing 2322 in the upward mode M2 of the vent module 2000 and toward the 1-2 wing 2314 and the 1-4 wing 2324 in the downward mode M3 of the vent module 2000. Accordingly, the vent module 2000 of the present invention may have a structure in which an air flow path is determined in the duct housing 2100 as compared to a structure of the conventional vent module which allows air to move toward an upper side or lower side in a passenger room at a time point at which the air is discharged from a duct housing 2100.

Accordingly, since a phenomenon of air leaking to a lower side of the duct housing 2100 is prevented in the upward mode M2, and a phenomenon of air leaking to an upper side of the duct housing 2100 is prevented in the downward mode M3, a wind volume of the air discharged to the outside of the duct housing 2100 is maintained to secure the reliability of the vent module 2000 in each mode.

The partition unit 2400 may be disposed behind the garnish 1000 in the air flow direction. The partition unit 2400 may guide movement of air passing through the first wing 2300. The partition unit 2400 may include a first partition part 2410, a second partition part 2420, and a support plate 2430.

The first partition part 2410 may be disposed close to the 1-1 wing 2312 and the 1-3 wing 2322. The first partition part 2410 may include a first linear part 2412 and a first inclined part 2414.

The first linear part 2412 may be disposed close to the first rotary shaft 2316 and the second rotary shaft 2326. The first linear part 2412 may be disposed to protrude toward the outside of the 1-1 wing 2312 and the 1-3 wing 2322 from a position close to the first rotary shaft 2316 and the second rotary shaft 2326. Support grooves which rotatably support the first rotary shaft 2316 of the main wing 2310 and the second rotary shafts 2326 of the sub wings may be formed in the first linear part 2412. The support grooves may be connected to the support grooves formed in the support block 2340 of the first wing 2300.

The first inclined part 2414 may have a shape protruding from an end portion of the first linear part 2412. The first inclined part 2414 may be disposed to be inclined in a direction from the 1-2 wing 2314 toward the 1-1 wing 2312. The first inclined part 2414 may be disposed between a 2-1 wing 2510 and a 2-2 wing 2520, which will be described below, of the second wing 2500. The first inclined part 2414 may guide air passing through the 1-1 wing 2312 and the 1-3 wing 2322.

The second partition part 2420 may be disposed close to the 1-2 wing 2314 and the 1-4 wing 2324. The second partition part 2420 may be disposed to be spaced apart from the first partition part 2410. The second partition part 2420 may include a second linear part 2422 and a second inclined part 2424.

The second linear part 2422 may be disposed close to the first rotary shaft 2316 and the second rotary shaft 2326. The second linear part 2422 may be disposed to protrude toward the outside of the 1-2 wing 2314 and the 1-4 wing 2324 from a position close to the first rotary shaft 2316 and the second rotary shaft 2326. Support grooves which rotatably support the first rotary shaft 2316 of the main wing 2310 and the second rotary shafts 2326 of the sub wings may be formed in the second linear part 2422. The support grooves may be connected to the support grooves formed in the support block 2340 of the first wing 2300.

The second inclined part 2424 may have a shape protruding from an end portion of the second linear part 2422. The second inclined part 2424 may be disposed to be inclined in a direction from the 1-1 wing 2312 toward the 1-2 wing 2314. The second inclined part 2424 may be disposed between the 2-1 wing 2510 and the 2-2 wing 2520, which will be described below, of the second wing 2500. The second inclined part 2424 may guide air passing through the 1-2 wing 2314 and the 1-4 wing 2324.

The support plate 2430 may be disposed between the first partition part 2410 and the second partition part 2420. The support plate 2430 may connect the first linear part 2412 and the second linear part 2422. The support plate 2430 may serve as a rib to reinforce the first inclined part 2414 and the second inclined part 2424.

The second wing 2500 may be disposed in front of the first wing 2300 in a flow direction of air flowing in the duct housing 2100. The second wing 2500 may be disposed behind the garnish 1000 to guide air passing through the first wing 2300. The second wing 2500 may include the 2-1 wing 2510, the 2-2 wing 2520, a connect wing 2530, and a second link plate 2540.

The 2-1 wing 2510 may be disposed above the first inclined part 2414 of the partition unit 2400 in the height direction. The 2-1 wing 2510 may guide air passing through the 1-1 wing 2312 and the 1-3 wing 2322.

The 2-2 wing 2520 may be disposed under the second inclined part 2424 of the partition unit 2400 in the height direction. The 2-2 wing 2520 may guide air passing through the 1-2 wing 2314 and the 1-4 wing 2324.

The connect wing 2530 may be disposed between the 2-1 wing 2510 and the 2-2 wing 2520. The connect wing 2530 may be disposed between the first inclined part 2414 and the second inclined part 2424 of the partition unit 2400. The connect wing 2530 may be connected to a link arm 2630, which will be described below, of the rotation driving assembly 2600 and rotated in conjunction with movement of the link arm 2630.

The second link plate 2540 may connect the 2-1 wing 2510, the 2-2 wing 2520, and the connect wing 2530. The second link plate 2540 may rotate the 2-1 wing 2510 and the 2-2 wing 2520 in the same direction as a rotation direction of the connect wing 2530 according to rotation of the connect wing 2530.

The rotation driving assembly 2600 may connect the nozzle 2200 and the second wing 2500. The rotation driving assembly 2600 may rotate the nozzle 2200 and the second wing 2500 in the same direction. The rotation driving assembly 2600 may include the first driving unit 2610, a first guide plate 2620, the link arm 2630, a second guide plate 2640, and a third guide plate 2650.

The first driving unit 2610 may be disposed outside the duct housing 2100. The first driving unit 2610 includes a motor 2612 which generates a driving force, the gear unit 2614 which connects the motor 2612 and the nozzle 2200, a hinge plate 2616 which is coupled to the gear unit 2614 and rotates with the gear unit 2614, and a case 2618 which accommodates the motor 2612 and the gear unit 2614 therein. That is, in the first driving unit 2610, when power is generated by the motor 2612, the gear unit 2614 connected to the motor 2612 may be rotated to rotate the hinge plate 2616. In this case, since the hinge plate 2616 is coupled to the first guide plate 2620, when the hinge plate 2616 rotates, the first guide plate 2620 may be rotated. The motor 2612 may be operated by a control unit (not shown) disposed in the vehicle.

The first guide plate 2620 may be disposed outside the duct housing 2100. The first guide plate 2620 may be coupled to the hinge plate 2616 of the first driving unit 2610. The first guide plate 2620 may be rotated along the hinge plate 2616. An edge of the first guide plate 2620 may have a fan shape. The first guide plate 2620 may include a guide groove 2622.

The guide groove 2622 may be formed in the first guide plate 2620. The guide groove 2622 may movably accommodate a part of the link arm 2630. When the first guide plate 2620 rotates along the hinge plate 2616, the guide groove may guide a movement direction of the link arm 2630. Meanwhile, a triangular mark may be formed around one region of the guide groove 2622 and may be a mark indicating a region at which a part of the link arm 2630 is positioned in the normal mode M1 of the vent module 2000.

The link arm 2630 may be disposed outside the duct housing 2100. The link arm 2630 may connect the first guide plate 2620 and the second wing 2500. More specifically, the link arm 2630 may connect the first guide plate 2620 and the connect wing 2530 of the second wing 2500. When the first guide plate 2620 rotates, the link arm 2630 may be guided by the first guide plate 2620, and a position of the link arm 2630 may be changed.

The link arm 2630 may include a main body connected to the connect wing 2530 of the second wing 2500 and a moving protrusion which protrudes from the main body and is movably disposed in the guide groove 2622 of the first guide plate 2620. A hole which accommodates a central protrusion 2112 formed on the upper housing 2110 of the duct housing 2100 therein may be formed in the main body. The link arm 2630 may rotate around the central protrusion 2112 formed on the upper housing 2110.

The second guide plate 2640 may be disposed between the second wing 2500 and the link arm 2630. The second guide plate 2640 may be disposed close to an inner surface of the duct housing 2100. The second guide plate 2640 may be connected to the second wing 2500 to guide a movement direction of the second wing 2500 moving along the link arm 2630.

To this end, a hole which guides the connect wing 2530 of the second wing 2500 may be formed in the second guide plate 2640. In addition, the second guide plate 2640 may rotatably support the 2-1 wing 2510, the 2-2 wing 2520, and the connect wing 2530.

The third guide plate 2650 may be disposed close to the inner surface of the duct housing 2100. The third guide plate 2650 may be disposed close to the second link plate 2540 of the second wing 2500. An edge of the third guide plate 2650 may have the same shape as that of the second guide plate 2640. A groove which accommodates the second link plate 2540 of the second wing 2500 may be formed in the third guide plate 2650.

As illustrated in FIGS. 4 and 7, the second driving unit 2700 may be disposed outside the duct housing 2100. The second driving unit 2700 may include a gear unit connected to the first rotary shaft 2316 of the main wing 2310 of the first wing 2300, a motor which is connected to the gear unit and generates power to rotate the gear unit, and a case which accommodates the gear unit and the motor therein. The motor may be operated by the control unit disposed in the vehicle. The second driving unit 2700 may rotate the main wing 2310 of the first wing 2300.

The second seal pad 2800 may be disposed on each of the upper housing 2110 and the lower housing 2120 of the duct housing 2100. The second seal pad 2800 may be disposed to protrude toward the inside of the duct housing. In this case, a corresponding surface 2810 corresponding to a shape of an edge of the first tip portion 2212 and a shape of an edge of the second tip portion 2232 of the nozzle 2200 may be formed on the second seal pad 2800 disposed on the upper housing 2110. When the nozzle 2200 rotates in the closed mode M4 of the vent module 2000, since the first tip portion 2212 and the second tip portion 2232 of the nozzle 2200 are in contact with the corresponding surface 2810, movement of air directed toward the nozzle 2200 may be blocked.

The vent module 2000 may be disposed behind the garnish 1000 in the air flow direction and may be disposed in the cockpit C to form a final discharge path of air together with the cockpit C and the garnish 1000. That is, since the vehicle air vent system 1 according to one embodiment of the present invention may highlight a design of the garnish 1000 while hiding the wing through which wind passes, aesthetics and air flow in the vehicle can be controlled.

Hereinafter, a process in which the rotation driving assembly rotates the nozzle and the second wing to implement each mode of the vent module will be described.

The vent module 2000 of the vehicle air vent system 1 may be linked to a control device (not shown) disposed in the vehicle, and various modes may be implemented by the vent module 2000 according to control signals of the control device. The normal mode M1, the upward mode M2, the downward mode M3, and the closed mode M4 may be implemented by the vent module 2000.

Referring to FIGS. 5, 8, and 9, when the control device of the vehicle transmits a control signal for the normal mode M1, the motor 2612 of the first driving unit 2610 of the rotation driving assembly 2600 of the vent module 2000 receives the control signal transmitted from the control device. In this case, the control signal corresponding to the normal mode M1 is a signal for stopping the motor 2612. Accordingly, the motor 2612 which receives the control signal is stopped according to the control signal.

Since the motor 2612 stops, the gear unit 2614 connected to the motor 2612, the hinge plate 2616 connected to the gear unit 2614, and the first guide plate 2620 connected to the hinge plate 2616 do not rotate. In addition, the link arm 2630 connected to the first guide plate 2620 and the connect wing 2530 of the second wing 2500 connected to the link arm 2630 do not rotate. In this case, a state in which the link arm 2630 is disposed in the longitudinal direction is maintained as illustrated in FIG. 8.

In addition, the nozzle 2200 in the normal mode M1 is disposed at a position at which a region in the duct housing 2100 is opened to allow air to pass through. More specifically, the first nozzle plate 2210 is disposed close to the upper housing 2110 in the same direction as the air flow direction, and the second nozzle plate 2220 may be disposed close to the lower housing 2120 in the same direction as the air flow direction.

Accordingly, air passing through the nozzle 2200 in the duct housing 2100 is branched off by the support block 2340 of the first wing 2300 as illustrated in FIG. 9 and passes through the 1-1 wing 2312, the 1-3 wing 2322, the 1-2 wing 2314, and the 1-4 wing 2324.

The air passing through the 1-1 wing 2312 and the 1-3 wing 2322 is guided by the first inclined part 2414 of the first partition part 2410 of the partition unit 2400 and the 2-1 wing 2510 of the second wing 2500 and moved toward the inside garnish 1100. In this case, the 2-1 wing 2510 is disposed in the same direction as a direction in which the first nozzle plate 2210 of the nozzle 2200 is disposed. In addition, the air passing through the 1-2 wing 2314 and the 1-4 wing 2324 is guided by the second inclined part 2424 of the second partition part 2420 of the partition unit 2400 and the 2-2 wing 2520 of the second wing 2500 and moved toward the inside garnish 1100. In this case, the 2-2 wing

2520 is disposed in the same direction as a direction in which the second nozzle plate 2220 of the nozzle 2200 is disposed.

As described above, the air passing through the 2-1 wing 2510 moves along an outer surface of the inside garnish 1100 and moves over the outside garnish 1200 toward the passenger room. In this case, the air moves along the outer surface of the inside garnish 1100 according to the Coanda effect. In addition, the air passing through the 2-2 wing 2520 moves along the outer surface of the inside garnish 1100 and moves over the outside garnish 1200 toward the passenger room. In this case, the air moves along the outer surface of the inside garnish 1100 according to the Coanda effect.

As illustrated in FIG. 9, air passing through the upper side of the inside garnish 1100 and air passing through the lower side of the inside garnish 1100 in the height direction move in directions intersecting each other. Accordingly, a pressure of a region in front of the outside garnish 1200 may be reduced as the air flows. Accordingly, the air passing through the upper side and the lower side of the inside garnish 1100 generates an effect of pulling air flowing subsequently. Accordingly, the air passing through the garnish 1000 in the normal mode M1 does not move toward an upper side or lower side in the passenger room.

FIG. 10 is a view illustrating the vent module in the upward mode, and FIG. 11 is a view illustrating a path along which air flows in the vent module in the upward mode.

Referring to FIGS. 5, 10, and 11, when the control device of the vehicle transmits a control signal for the upward mode M2, the motor 2612 of the first driving unit 2610 of the rotation driving assembly 2600 of the vent module 2000 receives the control signal transmitted from the control device. The motor 2612 which receives the control signal is driven according to the control signal. Accordingly, as illustrated in FIG. 10, the gear unit 2614 connected to the motor 2612 rotates, the hinge plate 2616 connected to the gear unit 2614 rotates, and the first guide plate 2620 connected to the hinge plate 2616 rotates.

When the gear unit 2614 is rotated by power of the motor 2612, the nozzle 2200 connected to the gear unit 2614 may also be rotated. More specifically, the first nozzle plate 2210 of the nozzle 2200 in the upward mode M2 is disposed to be inclined upward in the height direction, and the second nozzle plate 2220 is disposed to be inclined upward in the height direction.

Accordingly, as illustrated in FIG. 11, air is guided by the nozzle 2200, is moved toward the 1-1 wing 2312 and the 1-3 wing 2322, and passes through 1-1 wing 2312 and 1-3 wing 2322. The air passing through the 1-1 wing 2312 and the 1-3 wing 2322 is guided by the first inclined part 2414 of the first partition part 2410 of the partition unit 2400 and the 2-1 wing 2510 of the second wing 2500 to move toward the upper side of the inside garnish 1100.

In this case, the 2-1 wing 2510 is disposed in the same direction as a direction in which the first inclined part 2414 of the first partition part 2410 of the partition unit 2400 is disposed. More specifically, when the first guide plate 2620 is rotated along the hinge plate 2616, the link arm 2630 is in contact with an end portion of the guide groove 2622 as a position of the guide groove 2622 of the first guide plate 2620 is changed as illustrated in FIG. 10. The link arm 2630 in contact with the end portion of the guide groove 2622 is pressed by the first guide plate 2620 and rotated and moved around the central protrusion 2112 of the upper housing 2110.

When the link arm 2630 is rotated and moved, the connect wing 2530 of the second wing 2500 connected to the link arm 2630 is rotated and moved in conjunction with the link arm 2630. More specifically, the connect wing 2530 is disposed to intersect the link arm. Accordingly, the connect wing 2530 is disposed to be inclined upward in the height direction as illustrated in FIGS. 10 and 11 and is disposed in the same direction as an arrangement direction of the first inclined part 2414 of the first partition part 2410.

According to the above-described structure, air passing through the 1-1 wing 2312 and the 1-3 wing 2322 is guided by the first inclined part 2414 of the first partition part 2410 and the 2-1 wing 2510 and moved toward the inside garnish 1100, and the air discharged from the inside garnish 1100 is ultimately moved toward the upper side in the passenger room in the height direction.

FIG. 12 is a view illustrating the vent module in the downward mode, and FIG. 13 is a view illustrating a path along which air flows in the vent module in the downward mode.

Referring to FIGS. 5, 12, and 13, when the control device of the vehicle transmits a control signal for the downward mode M3, the motor 2612 of the first driving unit 2610 of the rotation driving assembly 2600 of the vent module 2000 receives the control signal transmitted from the control device. The motor 2612 which receives the control signal is driven according to the control signal. As illustrated in FIGS. 5 and 12, the gear unit 2614 connected to the motor 2612 rotates, the hinge plate 2616 connected to the gear unit 2614 rotates, and the first guide plate 2620 connected to the hinge plate 2616 rotates.

When the gear unit 2614 is rotated by power of the motor 2612, the nozzle 2200 connected to the gear unit 2614 may also be rotated. More specifically, the first nozzle plate 2210 of the nozzle 2200 in the downward mode M3 is disposed to be inclined downward in the height direction, and the second nozzle plate 2220 is disposed to be inclined downward in the height direction.

Accordingly, as illustrated in FIG. 13, air is guided by the nozzle 2200, is moved toward the 1-2 wing 2314 and the 1-4 wing 2324, and passes through the 1-2 wing 2314 and the 1-4 wing 2324. The air passing through the 1-2 wing 2314 and the 1-4 wing 2324 is guided by the second inclined part 2424 of the second partition part 2420 of the partition unit 2400 and the 2-2 wing 2520 of the second wing 2500 and moved toward the lower side of the inside garnish 1100.

In this case, the 2-2 wing 2520 is disposed in the same direction as a direction in which the second inclined part 2424 of the second partition part 2420 of the partition unit 2400 is disposed. More specifically, when the first guide plate 2620 rotates along the hinge plate 2616, the link arm 2630 is disposed in one region of the guide groove 2622 as a position of the guide groove 2622 of the first guide plate 2620 is changed as illustrated in FIG. 12. In this case, the link arm 2630 is rotated and moved around the central protrusion 2112 of the upper housing 2110 in conjunction with movement of the first guide plate 2620.

When the link arm 2630 is rotated and moved, the connect wing 2530 of the second wing 2500 connected to the link arm 2630 is rotated and moved in conjunction with the link arm 2630. More specifically, the connect wing 2530 is disposed to intersect the link arm. Accordingly, the connect wing 2530 is disposed to be inclined downward in the height direction as illustrated in FIGS. 12 and 13 and is disposed in the same direction as an arrangement direction of the second inclined part 2424 of the second partition part 2420.

According to the above-described structure, air passing through the 1-2 wing 2314 and the 1-4 wing 2324 is guided by the second inclined part 2424 of the second partition part

2420 and the 2-2 wing 2520 and moved toward the inside garnish 1100, and the air discharged from the inside garnish 1100 is ultimately moved toward the lower side in the passenger room in the height direction.

FIG. 14 is a view illustrating the vent module in the closed mode, and FIG. 15 is a view illustrating a path along which air flows in the vent module in the closed mode.

Referring to FIGS. 5, 14, and 15, when the control device of the vehicle transmits a control signal for the closed mode M4, the motor 2612 of the first driving unit 2610 of the rotation driving assembly 2600 of the vent module 2000 receives the control signal transmitted from the control device. The motor 2612 which receives the control signal is driven according to the control signal. Accordingly, as illustrated in FIGS. 5 and 14, the gear unit 2614 connected to the motor 2612 rotates, the hinge plate 2616 connected to the gear unit 2614 rotates, and the first guide plate 2620 connected to the hinge plate 2616 rotates.

When the gear unit 2614 is rotated by power of the motor 2612, the nozzle 2200 connected to the gear unit 2614 is also rotated. More specifically, the first nozzle plate 2210 of the nozzle 2200 in the closed mode M4 is disposed in a direction intersecting the air flow direction, and the second nozzle plate 2220 is disposed in a direction intersecting the air flow direction.

In the first nozzle plate 2210 disposed in the direction intersecting the air flow direction, the first tip portion 2212 and the second tip portion 2232 are in contact with the corresponding surface 2810 of the second seal pad. Accordingly, air flowing into the duct housing 2100 is blocked from moving by the first nozzle plate 2210 and may no longer flow.

As described above, since the vehicle air vent system 1 according to one embodiment of the present invention can set a movement direction of air introduced into the duct housing 2100 through various modes of air vent, and an error of a movement direction of air which moves according to each mode can be minimized, the reliability of the vehicle air vent system 1 can be improved.

FIG. 16 is a schematic view illustrating the lighting unit.

As illustrated in FIGS. 9 and 16, the lighting unit 2900 may be disposed between the inside garnish 1100 and the outside garnish 1200. The lighting unit 2900 may include a substrate 2910, a plurality of light sources 2920 attached to the substrate 2910 to generate light, a light guide 2930 disposed between the plurality of light sources 2920 to form a movement path of the light generated by the plurality of light sources 2920, and a panel 2940 which is coupled to the light guide 2930 using an adhesive material and on which the light moved through the light guide 2930 spreads. The outside garnish 1200 may be illuminated by the lighting unit 2900 and each symbol formed on the outside garnish 1200 may be highlighted.

According to one embodiment of the present invention, since a vent module is not exposed to the outside of a cockpit, the degradation of design aesthetics can be prevented.

In addition, according to one embodiment of the present invention, since a nozzle and a second wing for controlling a vertical wind direction can be moved in the same direction, a loss of a wind volume can be prevented.

While the present invention has been described above with reference to embodiment of the present invention, it may be understood by those skilled in the art that various modifications and changes of the present invention may be made within a range not departing from the spirit and scope of the present invention defined by the appended claims. In addition, it should be interpreted that differences related to the modifications and changes fall within the scope of the present invention defined by the appended claims.

What is claimed is:

1. A vehicle air vent system comprising:

a garnish mounted on a cockpit; and a vent module configured to discharge air transferred from an air conditioner together with the garnish and be covered by the garnish, wherein the vent module includes a duct housing into which the air transferred from the air conditioner is introduced, a nozzle configured to be disposed in the duct housing and rotates in the duct housing to guide the air introduced into the duct housing, a first wing configured to be disposed in front of the nozzle in an air flow direction and rotate in the duct housing in a different direction from a direction in which the nozzle rotates, a second wing configured to be disposed in front of the first wing in the air flow direction and disposed behind the garnish to guide air passing through the first wing, and a rotation driving assembly configured to connect the nozzle and the second wing and rotate the nozzle and the second wing in the same direction, wherein the rotation driving assembly includes:

a first driving unit including a motor which generates a driving force, a gear unit which connects the motor and the nozzle, and a hinge plate coupled to the gear unit and rotated together with the gear unit;

a first guide plate coupled to the hinge plate of the first driving unit and rotated along the hinge plate; and a link arm configured to connect the first guide plate and the second wing and be guided by the first guide plate to change a position when the first guide plate rotates.

2. The vehicle air vent system of claim 1, wherein the rotation driving assembly includes a second guide plate disposed between the second wing and the link arm and connected to the second wing to guide a movement direction of the second wing which moves along the link arm.

3. The vehicle air vent system of claim 1, wherein the garnish includes:

an inside garnish configured to be disposed in front of the second wing in the air flow direction and guide the air passing through the first wing together with the second wing; and an outside garnish coupled to the inside garnish and configured to be disposed to be exposed to a passenger room, wherein the outside garnish includes a discharge groove which is formed concavely in a direction intersecting the air flow direction and forms an air discharge path together with the cockpit.

4. The vehicle air vent system of claim 3, comprising a lighting unit configured to be disposed between the inside garnish and the outside garnish and emit light toward the outside garnish.

5. A vehicle air vent system, comprising:

a garnish mounted on a cockpit; and a vent module configured to discharge air transferred from an air conditioner together with the garnish and be covered by the garnish,

wherein the vent module includes a duct housing into which the air transferred from the air conditioner is introduced, a nozzle configured to be disposed in the duct housing and rotates in the duct housing to guide the air introduced into the duct housing, a first wing configured to be disposed in front of the nozzle in an air flow direction and rotate in the duct housing in a different direction from a direction in which the nozzle rotates, a second wing configured to be disposed in front of the first wing in the air flow direction and disposed behind the garnish to guide air passing through the first wing, a rotation driving assembly configured to connect the nozzle and the second wing and rotate the nozzle and the second wing in the same direction, and a plurality of partition parts configured to be disposed behind the garnish in the air flow direction and guide movement of the air passing through the first wing.

6. The vehicle air vent system of claim 5, comprising: a second driving unit configured to rotate the first wing, wherein the first wing includes:

a main wing configured to be connected to the second driving unit to be rotated by the second driving unit and include a 1-1 wing and a 1-2 wing disposed to be spaced apart from each other in a direction intersecting the air flow direction; and a plurality of sub wings configured to be disposed at two side portions of the main wing and be rotated in the same direction as a direction in which the main wing rotates when the main wing rotates, and include 1-3 wings and 1-4 wings disposed to be spaced apart from each other in the direction intersecting the air flow direction.

7. The vehicle air vent system of claim 6, wherein the the plurality of partition parts include:

a first partition part disposed close to the 1-1 wing and the 1-3 wings; and a second partition part disposed close to the 1-2 wing and the 1-4 wings, wherein the first partition part includes a first inclined part disposed to be inclined in a direction from the 1-2 wing toward the 1-1 wing, and the second partition part includes a second inclined part disposed to be inclined in a direction from the 1-1 wing toward the 1-2 wing.

8. The vehicle air vent system of claim 7, wherein the nozzle rotates so that air moves toward the 1-1 wing and the 1-3 wings in an upward mode and toward the 1-2 wing and the 1-4 wings in a downward mode.

9. The vehicle air vent system of claim 8, wherein the nozzle includes:

a first nozzle plate having a length in a width direction of the duct housing;

a second nozzle plate configured to be disposed to be spaced apart from the first nozzle plate to form an air flow path and open or close one region in the duct housing together with the first nozzle plate; and a side cover configured to be connected to the gear unit of the first driving unit and rotated in conjunction with the gear unit to rotate the first nozzle plate and the second nozzle plate.

* * * * *